(12) United States Patent
Poast et al.

(10) Patent No.: US 7,448,652 B2
(45) Date of Patent: Nov. 11, 2008

(54) TUBULAR METAL FITTING EXPANDABLE IN A WALL OPENING AND METHOD OF INSTALLATION

(75) Inventors: Tom G. Poast, Seattle, WA (US); Dean C. Madden, Coppell, TX (US); Mark R. Weiss, Seattle, WA (US)

(73) Assignee: Fatigue Technology Inc., Seattle, WA (US)

( * ) Notice: Subject to any disclaimer, the term of this patent is extended or adjusted under 35 U.S.C. 154(b) by 187 days.

(21) Appl. No.: 10/633,294

(22) Filed: Jul. 31, 2003

(65) Prior Publication Data

US 2005/0025601 A1  Feb. 3, 2005

(51) Int. Cl.
*F16L 3/04* (2006.01)

(52) U.S. Cl. ............... 285/136.1; 285/214; 285/222; 285/382.4; 285/217; 29/890.14

(58) Field of Classification Search ............... 285/140.1, 285/214, 216, 117, 222, 382.4, 382.5, 217, 285/136.1; 29/890.14
See application file for complete search history.

(56) References Cited

U.S. PATENT DOCUMENTS

| | | | | |
|---|---|---|---|---|
| 1,081,496 A | * | 12/1913 | Gillmor | 285/222 |
| 1,881,867 A | * | 10/1932 | Nelson | 29/890.044 |
| 2,092,358 A | * | 9/1937 | Robertson | 285/382.4 |
| 2,150,361 A | * | 3/1939 | Chobert | 285/222 |
| 2,695,446 A | * | 11/1954 | Meyer | 285/222 |
| 3,149,860 A | * | 9/1964 | Hallesy | 285/382 |
| 3,498,648 A | * | 3/1970 | Hallesy | 285/382.2 |
| 3,674,292 A | * | 7/1972 | Demler, Sr. | 285/382.4 |
| 3,778,090 A | * | 12/1973 | Tobin | 285/222 |
| 3,787,945 A | * | 1/1974 | Pasek et al. | 285/382.5 |
| 3,997,193 A | * | 12/1976 | Tsuda et al. | 285/382.4 |
| 4,249,786 A | | 2/1981 | Mahoff | 339/15 |
| 4,530,527 A | * | 7/1985 | Holmberg | 285/382.4 |
| 4,665,732 A | | 5/1987 | Hogenhout | 72/393 |
| 5,096,349 A | | 3/1992 | Landy et al. | 411/108 |
| 5,110,163 A | * | 5/1992 | Benson et al. | 285/382.2 |
| 5,218,854 A | | 6/1993 | Jarzebowicz et al. | 72/370 |
| 5,245,743 A | | 9/1993 | Landy et al. | 29/523 |
| 5,253,773 A | * | 10/1993 | Choma et al. | 285/222 |
| 5,390,808 A | * | 2/1995 | Choma et al. | 285/222 |
| 5,466,016 A | * | 11/1995 | Briody et al. | 285/382.5 |
| 5,713,611 A | * | 2/1998 | Kurimoto et al. | 285/222 |
| 6,131,964 A | * | 10/2000 | Sareshwala | 285/382 |
| 6,761,380 B2 | * | 7/2004 | Pachciarz et al. | 285/222 |
| 6,773,039 B2 | * | 8/2004 | Muenster et al. | 285/259 |

* cited by examiner

*Primary Examiner*—David Bochna
(74) *Attorney, Agent, or Firm*—Seed Intellectual Property Law Group PLLC

(57) ABSTRACT

A fitting is inserted into an opening in a wall. The fitting includes a ring portion where it extends through the opening. It also includes one or two end portions that extend axially outwardly from the ring portion. The ring portion has an inside diameter that is smaller than the inside diameters of the end portion or portions. The fitting is positioned within the wall openings. Then, an expansion tool is moved through the interior of fitting for the purpose of expanding the ring portion. The ring portion is expanded to such an extent that it makes a tight fit with the opening. Also, the degree of expansion may result in a cold working of the wall material surrounding the opening. The expansion tooling only expands the ring portion and does not exert a substantial expanding force on the end portions.

27 Claims, 9 Drawing Sheets

TUBULAR METAL FITTING EXPANDABLE IN A WALL OPENING AND METHOD OF INSTALLATION

TECHNICAL FIELD

The present invention relates to a fitting that fits in an opening in a wall and is expanded to secure it to the wall material surrounding the opening, and to installations that include such fitting and to methods of installing the fitting and making the installations.

BACKGROUND OF THE INVENTION

It is necessary at times to extend a conduit (e.g. fluid conduit, electrical conduit) through a wall, such as a bulkhead in an aircraft, for example. It is necessary that this conduit be firmly connected to the wall and at times be sealed against leakage, between it and the wall. It is an object of the present invention to provide a simple yet effective conduit installation composed of a fitting that is mounted in a single opening in the wall and conduit sections on one or both sides of the wall that are connected to the fitting, without there being any leakage from the conduit or between it and the wall.

An installation in which a conduit extends through a wall or bulkhead and is connected to a fitting that is connected to the wall is disclosed by U.S. Pat. No. 5,096,349, granted Mar. 17, 1992 to Michael A. Landry, Roger T. Bolstad, Charles M. Copple, Darryle Quincey, Eric T. Easterbrook, Leonard F. Reid and Louis A. Champoux. The system disclosed by this patent includes a fitting that has a tubular shank that fits into an opening in the wall and a head at one end of the shank that makes contact with the wall. The tubular shank is expanded into the opening. A conduit extends through a center opening in the fitting and is connected to the head of the fitting. An advantage of this installation is that only one opening in the wall is required. An object of the present invention is to use this advantage and combine with it other features which result in an improved installation.

BRIEF SUMMARY OF THE INVENTION

The present invention includes providing a tubular metal fitting that is insertable into a wall opening and expandable in the opening to connect it to the wall. The fitting includes a ring portion having a width that may be substantially equal to the wall thickness, an outer diameter that is snugly fittable within the wall opening, and an inner diameter that is separated from the outer diameter by a radius dimension. The fitting includes at least one elongated end portion projecting axially outwardly from the wall and ring portion. The end portion has an inside diameter that is larger than the inner diameter of the ring portion. The end portion has an outer end that is spaced axially outwardly from the ring portion. The ring portion is constructed from a metal that is expandable radially while the ring portion is in the opening in the wall. The ring portion is expanded an amount sufficient to create a tight interference fit between the outer diameter of the ring portion and the opening in a wall. The amount of expansion is sufficient to connect the tubular fitting to the wall.

In preferred form, the fitting has a first end portion extending axially outwardly from one side of the wall and a second end portion extending axially outwardly from the opposite or second side of the wall. The end portions of the fitting are adapted to be connected to end portions of conduit sections. A first conduit section is on the first side of the wall and is connected to the first end portion of the fitting. The second conduit section is on the second or opposite side of the wall and it is connected to the second end portion of the fitting.

In a preferred embodiment, the end portions of the fitting include radially outwardly opening girth grooves spaced axially outwardly from the wall and the ring portion of the fitting. A ring seal (e.g. O-ring) is positioned in each girth groove. The conduit sections slip onto the end portions of the fitting and the rings contact inner surfaces of the conduit section. The fitting may be adapted to receive an electrical conduit.

According to a method aspect of the invention, an expansion tool is moved axially through the inside of the fitting. The expansion tool exerts a radially outwardly directed force on the ring portion of the fitting, causing it to expand and remain expanded so that there is a tight interference fit between it and the sidewall in the opening of the wall. This fit functions to secure the fitting to the wall and also provides a fluid tight seal between the fitting and the sidewall of the opening. The inside diameter of the ring portion of the fitting is smaller than the of the tubular end portions of the fitting an appreciable amount. Movement of the expansion tool through the ring portion of the fitting increases the inside diameter of the ring portion of the fitting, but never to such an extent that the tooling expands the inside diameters of the end portions of the fitting. Thus, the end portions of the fitting may be sized for proper connection of the conduit sections to them and this sizing of the end portions of the fitting is not disturbed by the expansion used to connect the fitting to the wall.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

In the drawings, like reference numerals refer to like parts throughout the several views, and.

PRIOR ART INSTALLATIONS

Figure 1:
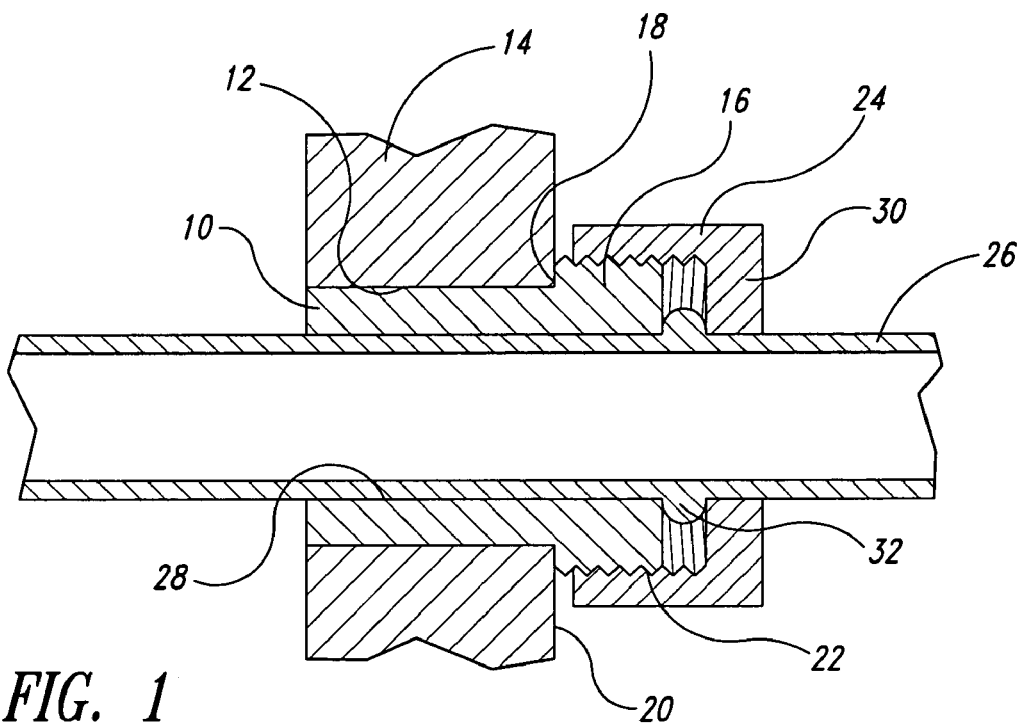
FIG. 1 is an axial sectional view of a prior art fitting in an opening in a wall, showing a conduit extending through the fitting and connector connecting the conduit to the fitting.
Figure 2:
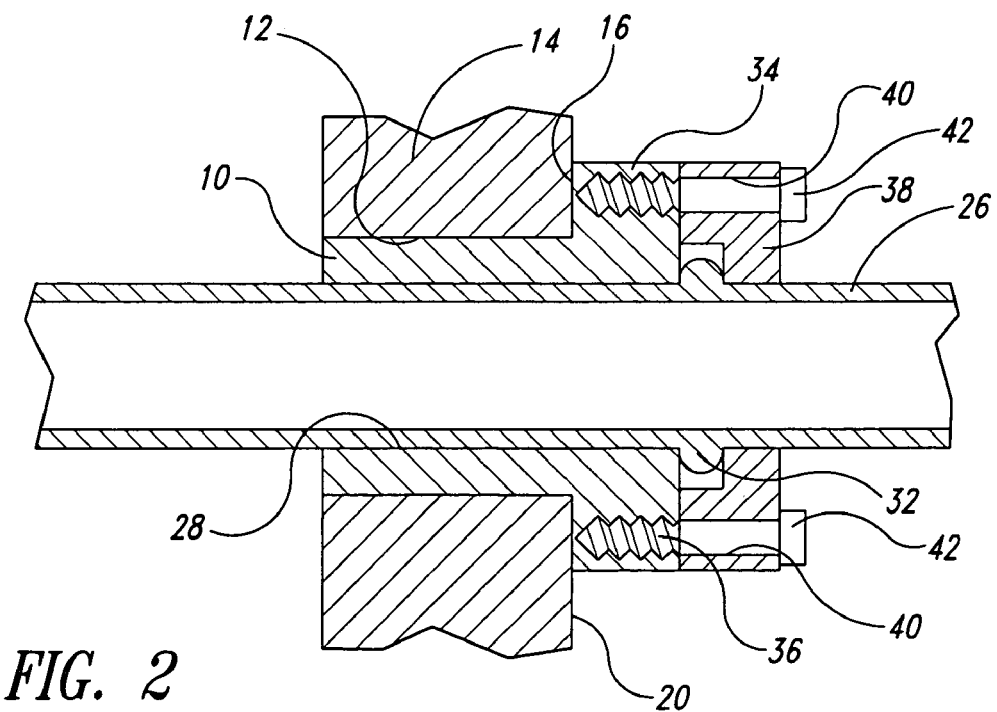
FIG. 2 is a view like FIG. 1 of a second prior art fitting, showing another form of connector connecting the conduit to the fitting.

FIGS. 1 and 2 of the drawing are in substance identical to FIGS. 30 and 31 of the aforementioned U.S. Pat. No. 5,096, 349. FIG. 1 shows a grommet 10 within an opening 12 in a wall 14. Grommet 10 is installed by radial expansion in a way that is described in detail in U.S. Pat. No. 5,096,349. Grommet 10 includes an enlarged head 16 presenting a shoulder 18 against the wall surface 20 where it immediately surrounds the opening 12. Head 16 is threaded at its outer periphery 22. These threads may receive the internal threads of a retainer nut 24. In FIG. 1, the retainer nut is shown to be used with a length of tubing 26, which fits into the center opening 28 of the grommet. A radial wall portion 30 on nut 24 bears against a radial flange 32 that is formed on the tubing 26.

FIG. 2 shows a similar installation. However, in this installation, the head 34 includes a plurality of internally threaded axial openings 36. A clamp washer 38 is shown positioned against the radial flange 32 on the tube 26. Openings 40 are provided in the washer 38. These openings 40 are equal in number and spacing to the threaded openings 36. Screw fasteners 42 are inserted through the openings 40 and are threaded into the openings 36, to secure the clamp washer 38 against the head 34.

Another prior art embodiment includes threaded openings which are oriented to extend radially through the head 16. These openings receive set screws which extend radially inwardly from the sidewall of the cap 24. The set screws and openings are used in place of the threads 22 shown in FIG. 1.

DETAILED DESCRIPTION OF THE INVENTION

Figure 3:
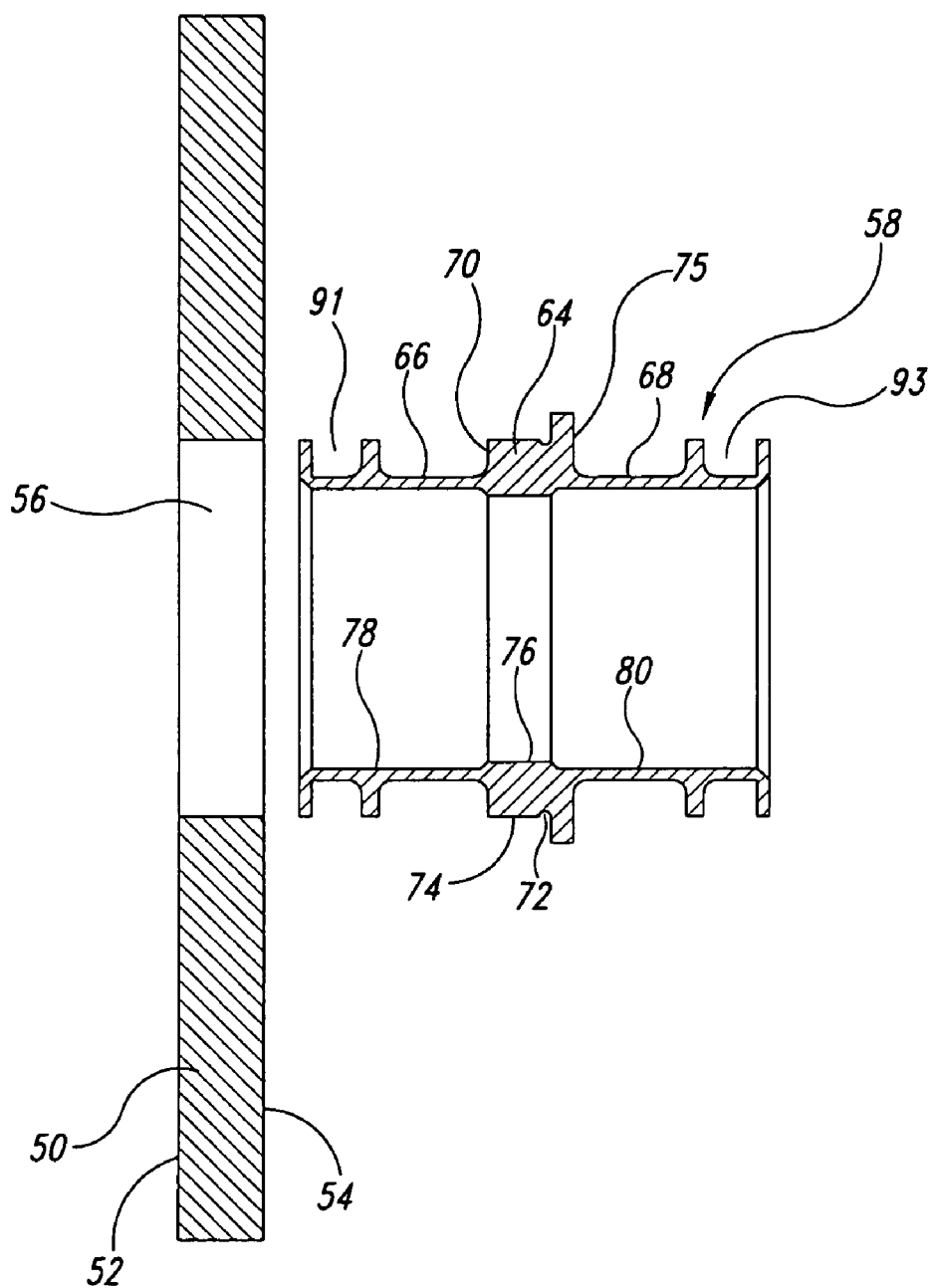
FIG. 3 is a longitudinal sectional view taken through a portion of a workpiece and an embodiment of the present invention that is securable an opening in the workpiece, such view showing the fitting spaced axially from the opening in the workpiece.
Figure 4:
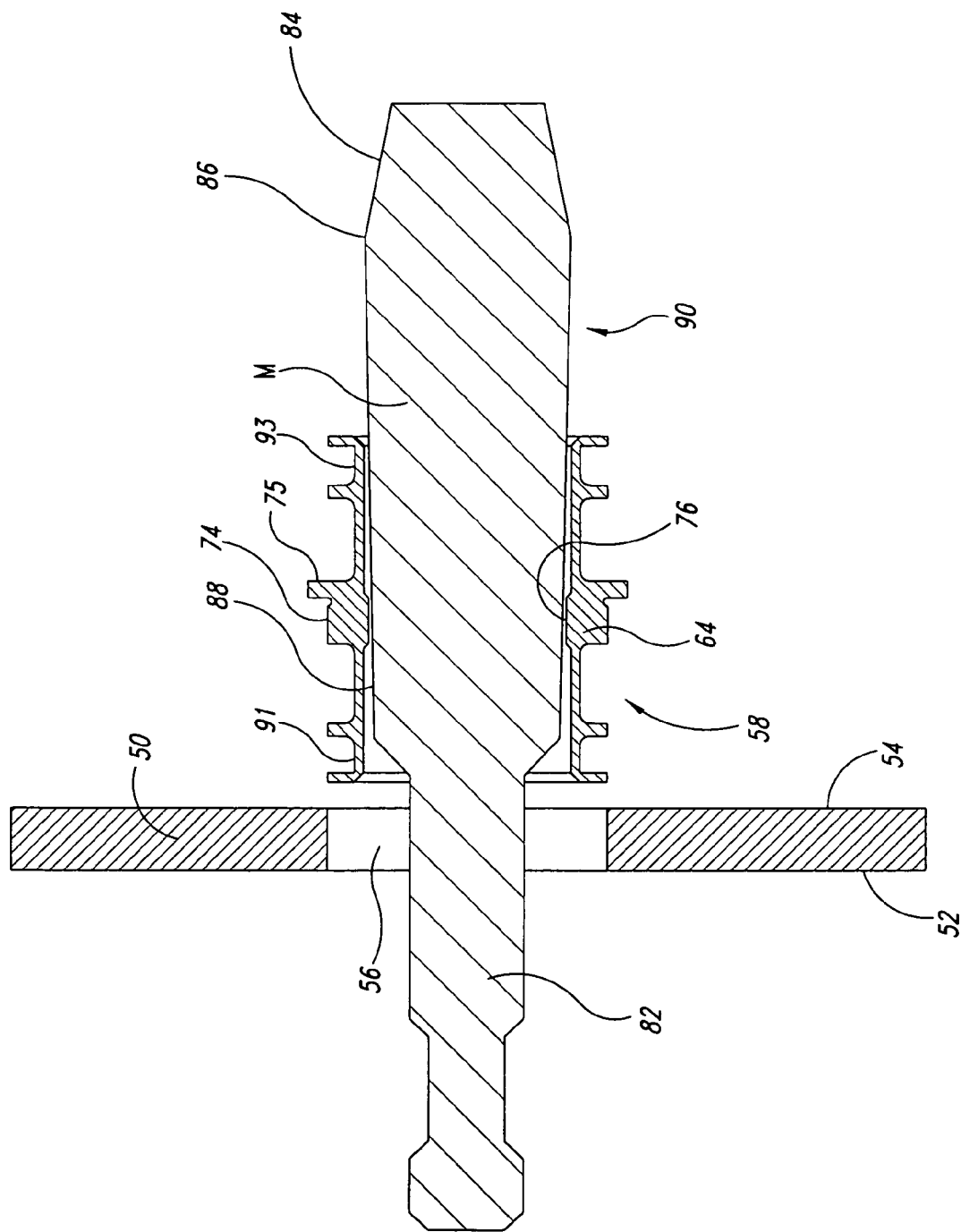
FIG. 4 is a view like FIG. 3, but showing a mandrel inside of the fitting and the base end of the mandrel extending through the opening in the workpiece.
Figure 5:
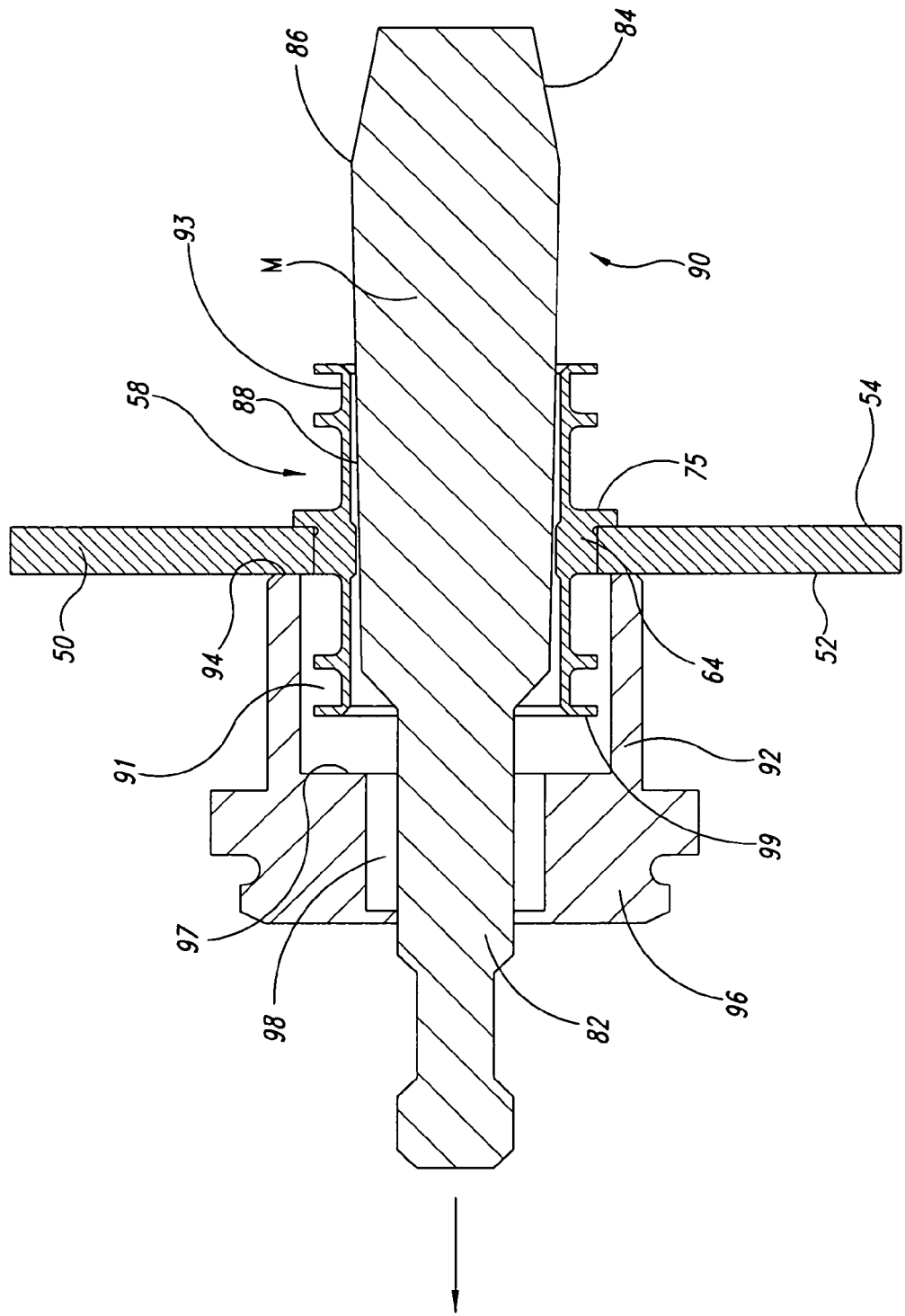
FIG. 5 is a view like FIG. 4, but further showing the fitting positioned within the opening in the workpiece, and showing a nose piece portion of a puller unit surrounding the fitting and mandrel, with its outer end positioned against the workpiece.
Figure 6:
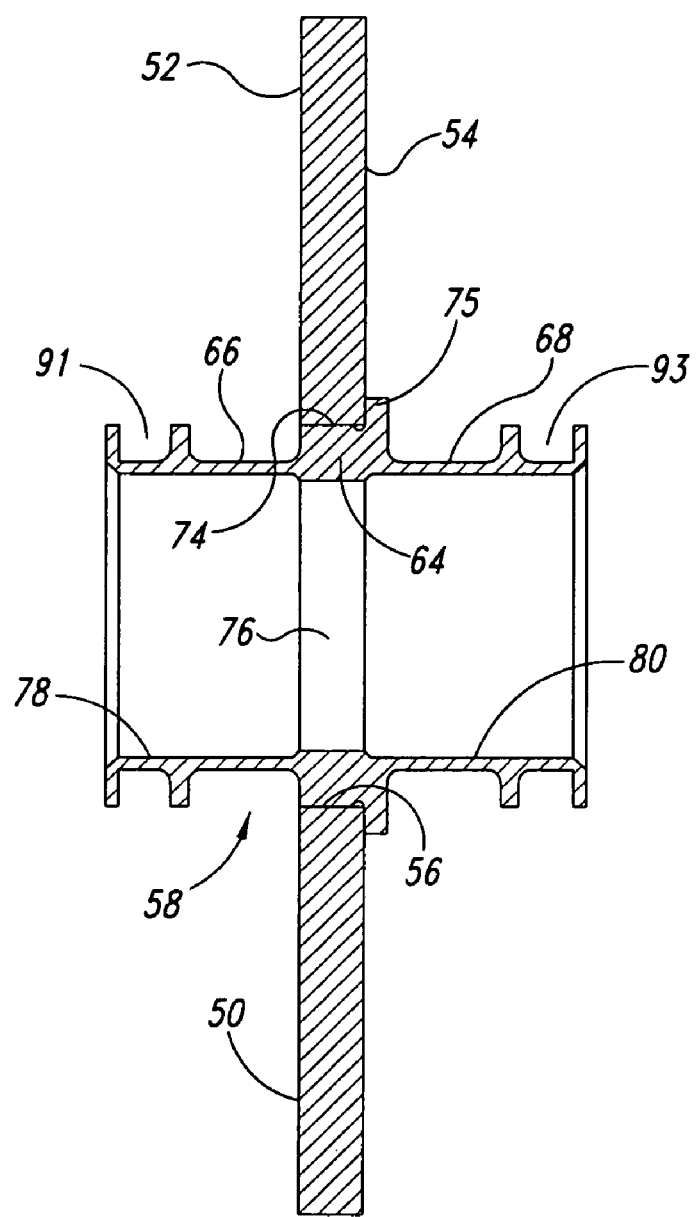
FIG. 6 is a view like FIG. 3, but showing the fitting positioned within the opening in the workpiece.
Figure 7:
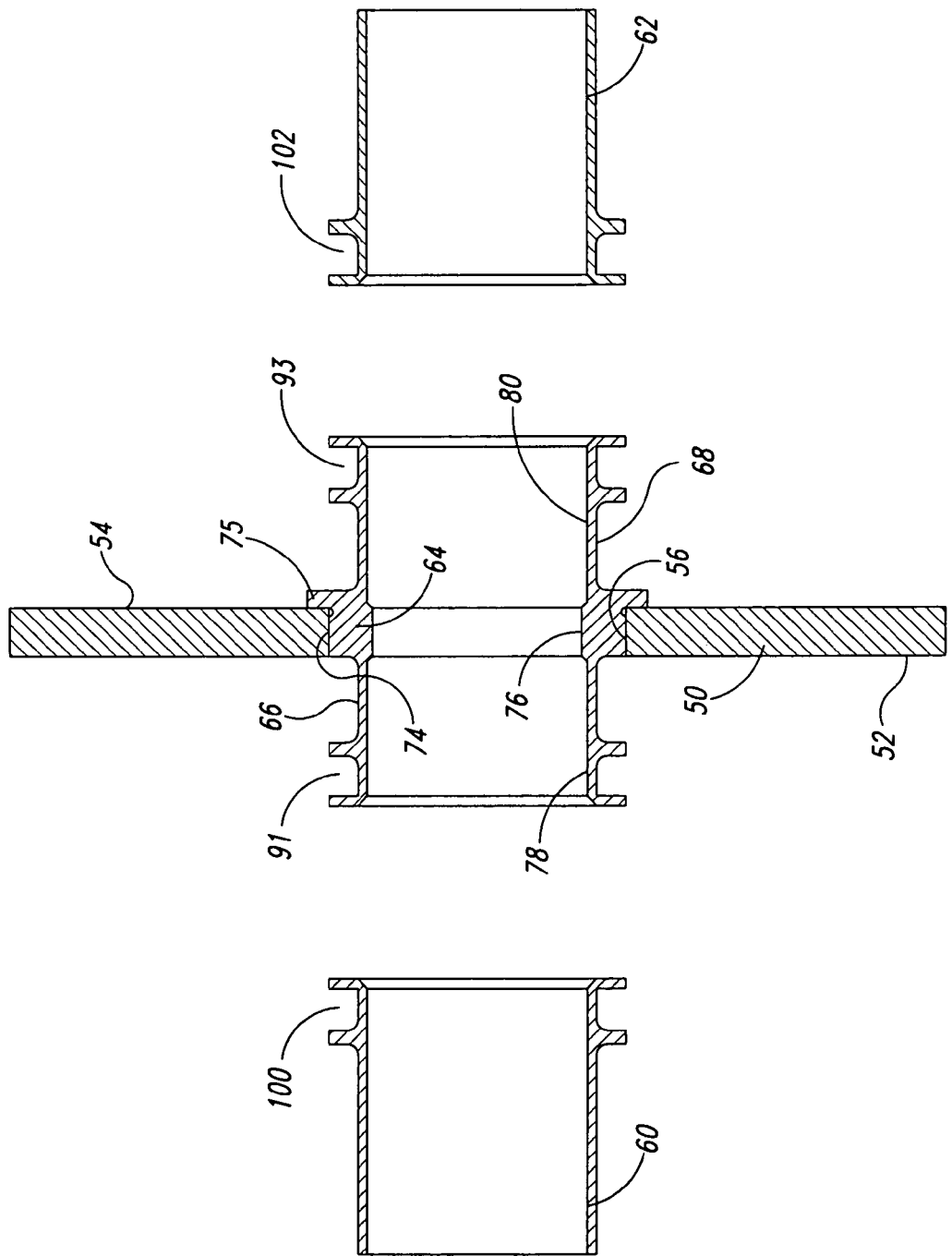
FIG. 7 is a view like FIG. 6, showing end portions of two conduits positioned axially outwardly from opposite end portions of the fitting.

FIGS. 3-5 show a wall or bulkhead 50 that includes a first side 52, a second side 54 and an axial opening 56 that extends through the wall 50, between the two sides 52, 54. In FIG. 3, a first fitting embodiment of the present invention, designated 58, is shown spaced axially from the opening 56. FIG. 6 shows the fitting 58 positioned inside the opening 56 and secured to the wall 50. FIG. 7 is a view like FIG. 6, but further includes end portions of first and second conduits 60, 62. First conduit 60 is on the first side of the wall 50. The second conduit 62 is on the opposite or second side of the wall 50.

In preferred form, fitting 58 comprises a ring portion 64 that is positioned axially between first and second end portions 66, 68. Ring portion 64 includes a first end 70 and a second end 72. A radial flange 75 extends radially outwardly from the fitting 58 adjacent the second end 72 of the ring portion 64. Ring portion 64 includes an outer diameter 74 and an inner diameter 76. End portions 66, 68 include inner diameters 78, 80 which may be substantially equal to each other, but are larger in diameter than the inner diameter 76 of the ring portion 64.

As shown by FIGS. 4 and 5, the fitting 58 is inserted into the opening 58, first end portion 66 first. The first end portion 66 is aligned with the opening 56 and then the end portion 66 is moved towards and through the opening 56. Eventually, the first end 70 of ring portion 64 is moved into and through the opening 56.

The outer diameter 74 of ring portion 64 is sized so that it is snugly fittable within the opening 56. The fitting 58 is moved axially until the flange 75 contacts the wall surface 54. This position of the flange 75 against the wall surface 54 is shown in FIGS. 5 and 6. When flange 75 is against surface 54, the ring portion 64 is within the opening 56. End portion 66 projects axially outwardly from the ring portion 64 on the sidewall 50 which includes surface 52. End portion 68 projects axially outwardly from ring portion 64 on the side of the wall 50 that includes surface 54. In a manner that will be hereinafter described, a split sleeve and mandrel or a mandrel only are moved axially through the fitting 58 for expanding the ring portion 64 within the opening 56. When a mandrel only is used, the mandrel may be a solid mandrel or may be a split mandrel. When a split sleeve is used, the split sleeve contacts the inner surface 76 of the ring portion 64. When a mandrel only is used (solid or split), the outer surface of the mandrel contacts the inner surface 76. Axial movement of the mandrel through the split sleeve, or axial movement of the mandrel alone, causes a radial expansion of ring portion 64, causing its inner and outer diameters to increase and form a tight interference fit with the wall of opening 56. This expansion is sufficient to secure the ring portion 64 within the opening 56, and the fitting 58 to the wall 50. Preferably, the amount of expansion applied is sufficient to cold work the material in the wall 50 surrounding the opening 56, for fatigue enhancement of the material. Expansion of the ring portion 64 will increase both its inner and outer diameters. However, its inner diameter is never expanded to such an extent that the expansion tooling expands the inner surfaces 78, 80 of the end portions 66, 68 of the fitting 58. That is, only the ring portion 64 of the fitting 58 and where it is attached to an end portion are radially expanded. The end portions 66, 68 are sized to perform their function as connector components and the original size is not changed by movement of the expansion tooling through the fitting 58 by an amount that is detrimental to the function.

U.S. Pat. No. 5,245,743, granted Sep. 21, 1993, to Michael A. Landy, Roger T. Bolstad, Charles A. Copple, Darryl E. Quincey, Eric T. Easterbrook, Leonard F. Reid and Louis A. Champoux discloses the use of a split sleeve and mandrel for installing a fitting in an opening in a wall. It discloses use of both a solid mandrel (FIGS. 22 and 23) and a split mandrel (column 8, lines 51-55). The mandrel only process, using a split mandrel, is disclosed by U.S. Pat. No. 4,665,732, granted May 19, 1987, to Franciscus Hogenhout, and assigned to West Coast Industries, Inc. The disclosures of these patents are incorporated by reference herein, for everything that they disclose.

FIGS. 4 and 5 show a mandrel M inside of the fitting. Mandrel M includes a base end 82, a tapered nose section 84, a maximum diameter region 86, a reduced diameter section 88 and a transitional section 90. In the transitional section 90, the diameter increases from the diameter in the section 88 up to the maximum diameter 86. As illustrated in FIGS. 4 and 5, the lesser diameter portion 88 of the mandrel is sized to fit and pass through the center opening in the fitting 58. In the section 88, the inside diameter 76 of the ring portion 64 is slightly larger than the diameter of the mandrel.

The mandrel M is moved into the fitting 58, in the manner illustrated in FIGS. 4 and 5. Then, the base end 82 of the mandrel M is secured to a moveable member within a puller unit. The puller unit includes a nose piece 92 (FIG. 5) which has an end 94 that is adapted to make contact with the workpiece 50. The puller is not shown but it may be similar to the puller that is disclosed in U.S. Pat. No. 5,218,854, granted Jun. 15, 1993 to Richard Z. Jarzebowicz, Joy S. Ransom, Eric T. Easterbrook, Charles M. Copple and Leonard F. Reid. As disclosed in the patent, the base end 82 of the mandrel M is adapted to be engaged by the outer end portion of an axially moveable push-pull member that is moved hydraulically forwardly and rearwardly.

Referring to FIG. 5, the nose piece 92 includes a rear end portion 96 having a center opening 98. Center opening 98 is sized to receive the maximum diameter section 86 of the mandrel M. The puller (not shown) is operated to pull on the base 82 of the mandrel M, to pull the mandrel M through the fitting 58. Initially, the mandrel section 88 will pass freely through the interior of the fitting 58. This will happen until the transition section 90 approaches the inner diameter 76 of the ring portion 64. As the section 90 passes through the ring portion 64, it progressively applies a radially outwardly directed force on the ring portion 64. This radial force increases the diameter of the ring portion 64 and moves its outer surface 74 against the inner surface of the opening 56. Ring portion 64 imposes a radially outwardly directed force on the material of wall 50 that immediately surrounds the opening 56. The ring portion 64 is expanded by the mandrel M an amount sufficient to plastically expand the ring portion 64 so that there is a tight interference fit between the surface 74 and the wall of the opening 56. The degree of expansion is preferably great enough to plastically expand the wall material 50 that immediately surrounds the opening 56. The first expansion, causing the interference fit, secures the fitting 58 in the opening 56. The additional expansion of the wall material surrounding the opening 56 provides fatigue enhancement in the wall material. As the mandrel M is being drawn through the fitting 58, the friction caused by contact of the transitional section 90 with the interior surface 76 of the ring portion 64 acts to pull the flange 75 tight against the wall 54. The moving mandrel M also causes a reacting force on the nose piece 92, moving the end surface 94 against the wall 50 on the side 52 opposite the flange 75.

The radial flange 75 is not an essential element. Nose piece 96 includes a radial surface 97. If the flange 75 is omitted, this surface 97 may be extended to where it contacts the end surface 99 of the fitting 58. This contact will prevent the fitting 58 from moving axially in response to the mandrel M being pulled through it.

When the sections 90 and 86 are being moved through the inside diameter 76 of the ring portion 64, the mandrel section 88 is moving through the opening 98. The mandrel M is pulled until the maximum diameter portion 86 has passed through the opening 76. When this happens, the puller/mandrel assembly can be pulled away from the wall 50, leaving the fitting 58 installed in the wall, as shown by FIG. 6. At no time during the movement of the mandrel M through the fitting 58 does the transitional and maximum diameter sections 90, 86 of the mandrel M expand the inner surfaces 78, 80 of the end portions 66, 68 of the fitting 58 by a substantial amount. It is only the ring portion 64 that is contacted and expanded by the mandrel sections 90, 86 by a substantial amount. The inside and outside diameters of the end portions 66, 68 do not change in size or shape, except where they join the ring section 64. Accordingly, they can be designed for their function of connecting the fitting 58 to conduit sections 60, 62 on the opposite sides of the wall 50.

Figure 8:
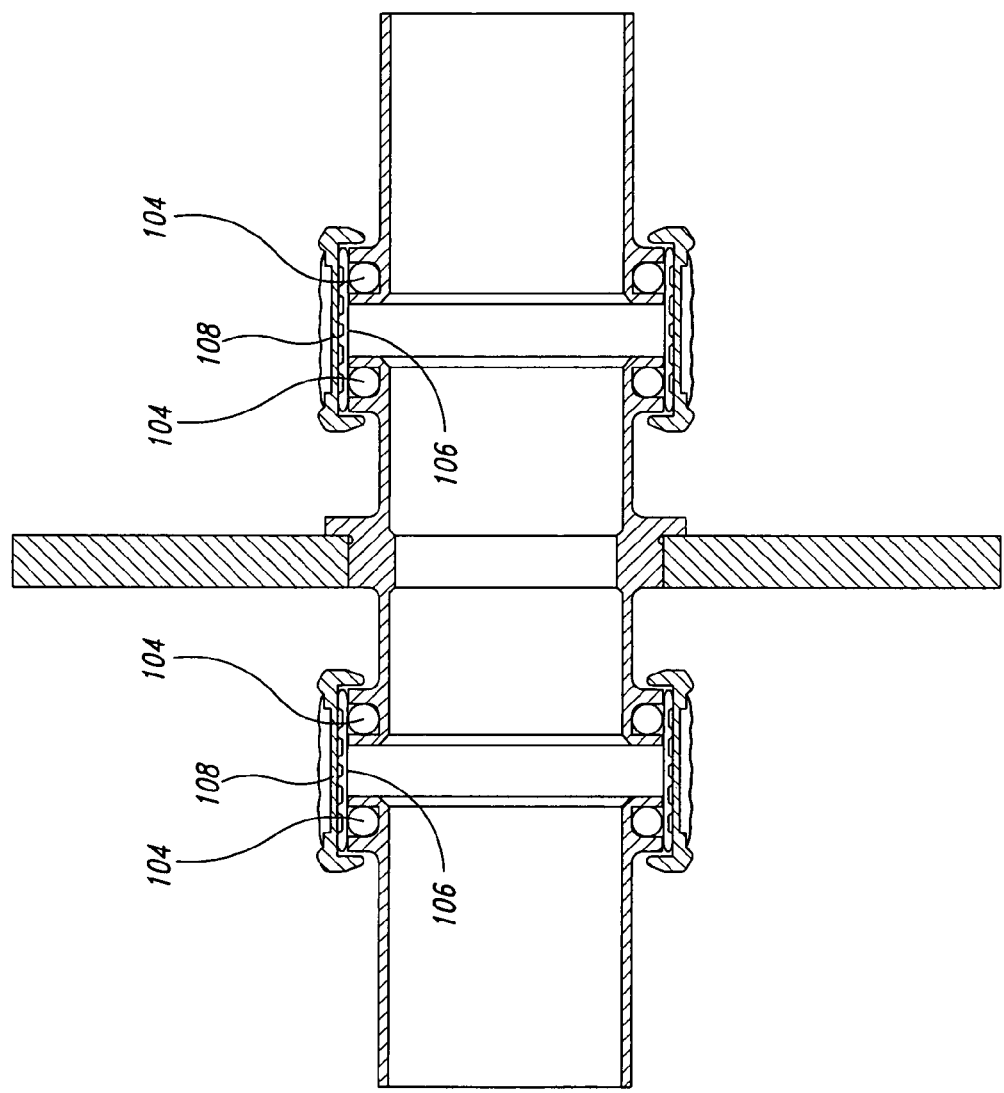
FIG. 8 is a view like FIG. 7, but showing O-rings in the girth grooves and clamp structure clamping the end portions of the fitting to adjacent end portions of the conduit sections.

As shown in FIGS. 3-8, the end portions 66, 68 include radially outwardly opening girth grooves or channels 91, 93 that are spaced axially outwardly from the ring portion 64. The conduit sections 60, 62 also include radially outwardly opening girth grooves or channels 100, 102. Channels 91, 93, 100, 102 are all constructed to receive O-ring seals 104, as shown by FIG. 8. A suitable clamp structure 106, 108 is provided to connect the end portions of the fitting to the end portions of the conduit sections. By way of typical but non-limitive example, the connection may be like the connection disclosed in U.S. Pat. No. 4,249,786, granted Feb. 10, 1981 to George A. Mahoff and assigned to Hydro-Flow Supply, Inc. See FIG. 4 of this patent, in particular. Because the connection and its parts are so well disclosed in U.S. Pat. No. 4,249,786, that disclosure will not be repeated herein in great detail. Rather, the contents of U.S. Pat. No. 4,249,786 are incorporated herein by this specific reference.

FIGS. 9-12 show modified constructions of the wall fitting. The fitting 110 (FIG. 9) shows a construction very similar to the construction shown by FIGS. 3-8. However, the radially outwardly directed girth grooves are replaced by radially inwardly directed girth grooves 112, 114 that are adapted to receive and connect to a different type of component at the end of the conduit sections (not shown).

Figure 10:
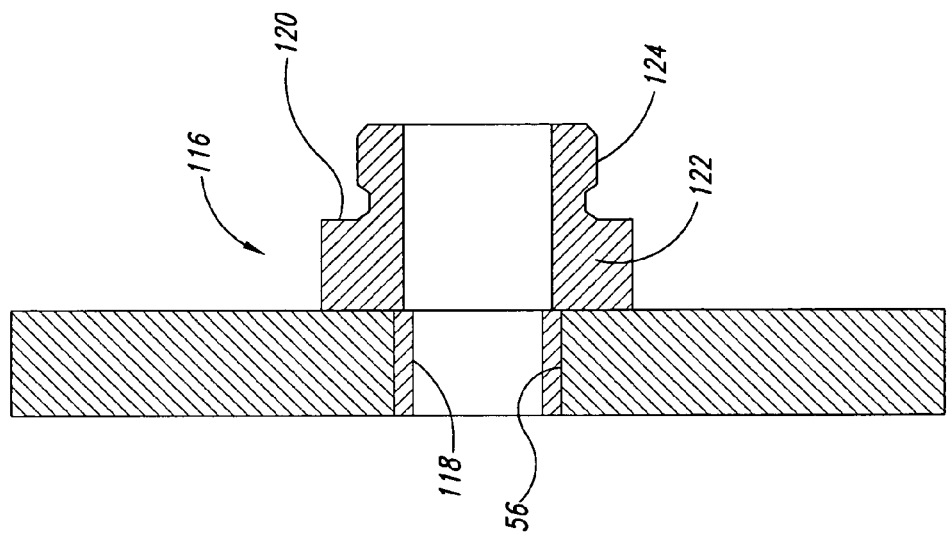
FIG. 10 is a view similar to FIG. 9, but showing a modified construction of the fitting.
Figure 9:
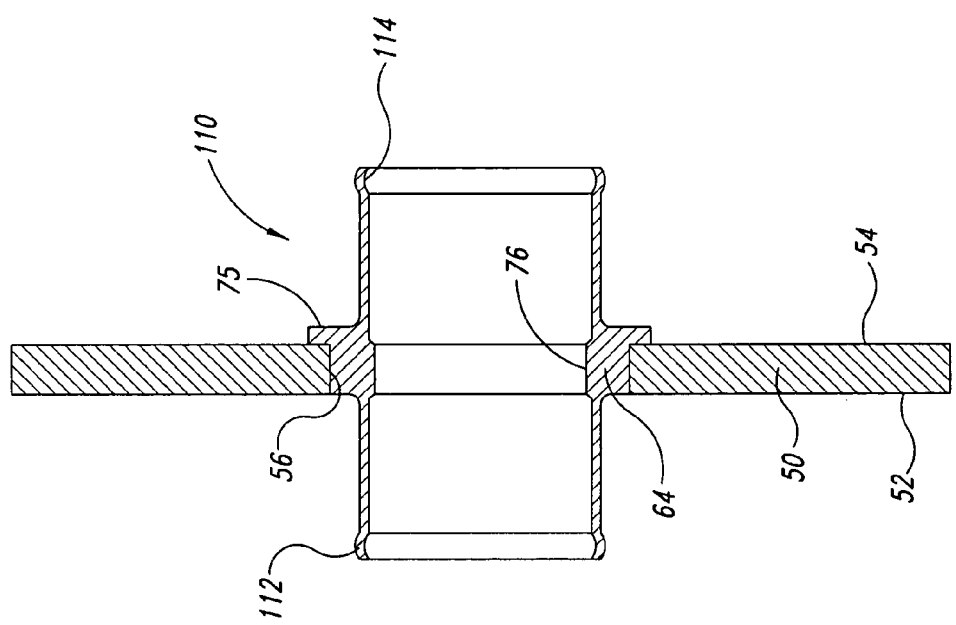
FIG. 9 is a view like FIG. 6, but showing a modified construction of the end portions of the fitting.

FIG. 10 shows a fitting 116 that includes a ring portion 118 that is in the wall opening 56, and a single end portion 120. End portion 120 includes a radial flange 122 and a threaded end portion 124. The threads may be like the threads on end portion 16 shown in FIG. 1. In this embodiment, like in the other embodiments, the inner diameter of the ring portion 118 is smaller than the outer diameter of the ring portion, for the same reason as stated above in connection with the other embodiments.

Figure 11:
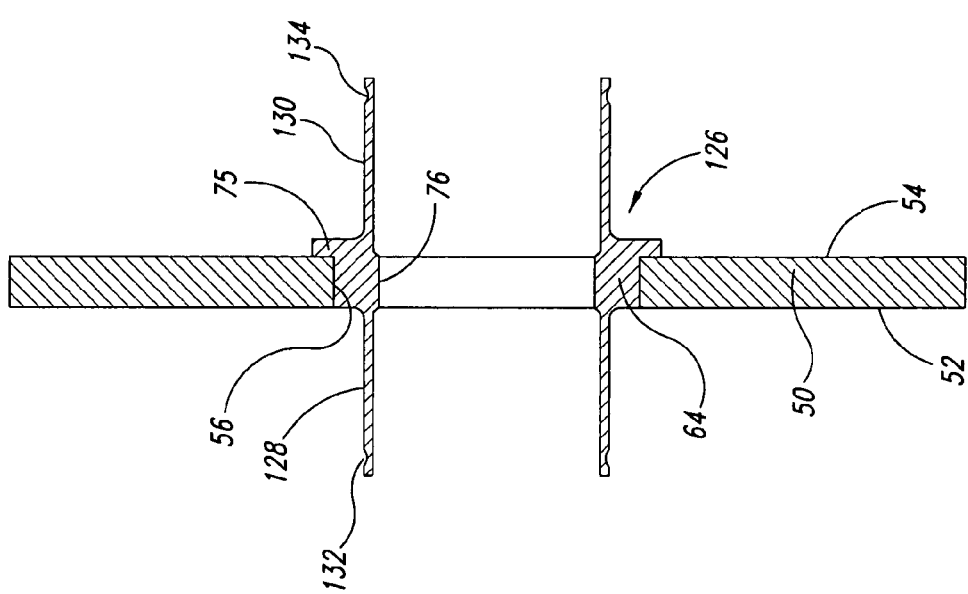
FIG. 11 is a view like FIGS. 6, 9 and 10, but of a further modified construction of the fitting.

The fitting 126 is shown by FIG. 11 has two end portions 128, 130, extending axially outwardly from the ring portion 64. The end portions 128, 130 show a modified construction of the radially outwardly opening girth rings 132, 134.

Figure 12:
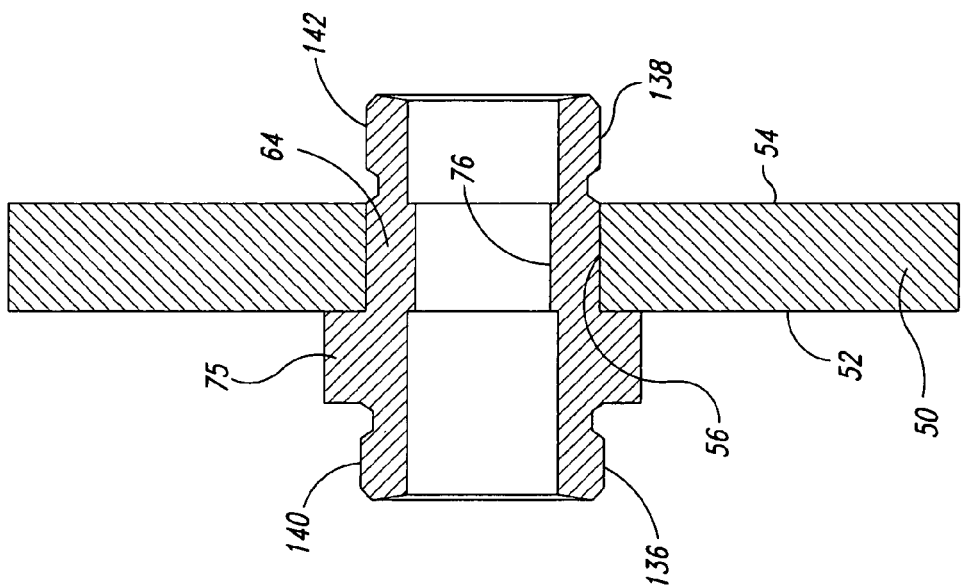
FIG. 12 is a view like FIGS. 6 and 9-11, but showing yet another construction of the fitting.

FIG. 12 shows a ring portion 64 and two end portions 136, 138. In this embodiment, the ring portion 64 has a smaller inside diameter than the end portions 136, 138 for the previously-stated reason. In this embodiment, the end portions 136, 138 have external threads 140, 142 for use in connecting them to the conduit sections. The flange 75 may have a hexagonal external shape, i.e. like a hex nut. This will enable it to be grasped by a wrench when fittings are being screwed onto the end threads 140, 142.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A system comprising:

a structural work piece having an opening;

a tubular fitting received in the opening of the structural work piece, the fitting comprising:

a ring portion having an outer circumference and an inner circumference, the outer circumference being closely receivable by the opening in the structural work piece when the ring portion is inserted into the opening;

at least a first coupling member having at least a minimum inner circumference, an outer envelope, and an end section, the coupling member extending axially from the ring portion, the minimum inner circumference being larger than the inner circumference of the ring portion, the outer envelope sized to be moved through the opening in the work piece, and the end section configured to be engageable with another device; and wherein the ring portion is expanded so as to establish a secure interference fit between the outer circumference of the ring portion and the opening in the work piece.

2. The system of claim 1 wherein the ring portion includes a radial flange located adjacent to the work piece when the outer circumference of the ring portion is within the opening in the work piece.

3. The system of claim 1, comprising a radially opening girth groove located near the end section of the coupling member.

4. The system of claim 1, comprising a second coupling member projecting axially from the ring portion and loaded on an opposing side of the work piece from the first coupling member.

5. The system of claim 4 wherein each coupling member has a radially opening girth groove.

6. The system of claim 1 wherein the structural work piece is a bulkhead.

7. The system of claim 1 wherein the opening has an axial length that is substantially equal to an axial length of the ring portion.

8. The system of claim 1 wherein at least one of the inner circumference and the outer circumference of the ring portion defines a generally cylindrical surface.

9. The system of claim 1 wherein a portion of the coupling member adjacent the ring portion has the minimum inner circumference that is larger than the inner circumference of the ring portion and a maximum outer circumference that is smaller than the outer circumference of the ring portion.

10. An assembly comprising:
a structural member having an opening defining an inner surface;
a fitting having a ring portion and at least one coupling section, the ring portion having an outer circumference and an inner circumference, the outer circumference being closely receivable by the opening in the structural member before the ring portion is radially expanded, the ring portion being radially expanded a sufficient amount to establish a secure interference fit between the outer circumference of the ring portion and the inner surface of the opening contacting the outer circumference, the at least one coupling section having at least a minimum inner circumference, an outer envelope, and a first portion, the coupling section extending axially from the ring portion, the minimum inner circumference being larger than the inner circumference of the ring portion, the outer envelope sized to be moved through the opening in the work piece; and
a first member having an inner passage and a first segment, the inner passage in fluid communication with the fitting when the first segment is coupled with the first portion of the at least one coupling section.

11. The assembly according to claim 10 wherein the first segment is coupled with the first portion of the at least one coupling section with a clamp.

12. The assembly according to claim 10 wherein the first segment of the first member and the first portion of the at least one coupling section are configured with grooves to receive seals.

13. The assembly according to claim 10 wherein the minimum inner circumference of the at least one coupling section is smooth.

14. The assembly according to claim 10 further comprising:
a radial flange coupled to the ring portion, the radial flange separated from the at least one coupling section by the ring portion.

15. The assembly according to claim 14 wherein a thickness of the ring portion is substantially equivalent to a thickness of the work piece.

16. The assembly of claim 10, further comprising:
a second coupling section of the fitting, the second coupling extending axially from the ring portion such that the ring portion is interposed between the two coupling sections; and
a second member having an inner passage in fluid communication with the fitting when the second member is coupled with the second coupling section.

17. A method for routing a conduit through an opening in a structural work piece, the method comprising:
inserting a first portion of a fitting into the opening in the structural work piece, the first portion of the fitting having an outer envelope sufficiently sized to be received by the opening;
positioning a ring portion of the fitting in the opening of the work piece, the ring portion connected with the first portion where the first portion extends axially from the ring portion, the ring portion having an outer circumference sized to fit tightly within the opening of the work piece while the first portion extends outwardly from the work piece;
inserting a mandrel through the fitting located in the work piece, the ring portion of the fitting having an outer circumference and an inner circumference sized to be radially expandable by an increased circumference section of the mandrel, the first portion of the fitting having an inner circumference sized to be slightly larger than the increased circumference section of the mandrel; and
expanding the ring portion of the fitting in an outwardly radial direction by physically contacting the increased circumference section of the mandrel with the ring portion as the mandrel is forced through the inner circumference of the ring portion such that the outer circumference of the ring portion contacts the opening so as to form an interference fit.

18. The method of claim 17, further comprising:
cold working the material in the work piece adjacently located to the outer circumference of the ring portion of the fitting.

19. The method of claim 17, further comprising:
after expanding the ring portion, coupling a conduit to the first portion of the fitting.

20. The method of claim 17 wherein the structural work piece is a bulkhead of an aircraft.

21. The method of claim 17 wherein the first portion extends from the structural work piece when the ring portion is positioned within the opening structural work piece.

22. The method of claim 17 wherein, before the expanding of the ring portion, the increased circumference section of the mandrel is larger than the inner circumference of the ring portion such that moving the increased circumference section of the mandrel through the ring portion causes the expanding of the ring portion.

23. The method of claim 17 wherein the mandrel comprises a circular tapered section that defines the increased circumference section.

24. A method for routing a conduit through an opening in a work piece, the method comprising:
inserting a first portion of a fitting into the opening in the work piece, the first portion of the fitting having an outer envelope sufficiently sized to be received by the opening, the fitting further having a ring portion positioned in the opening of the work piece, the ring portion connected with the first portion where the first portion extends axially from the ring portion, the ring portion having an outer perimeter sized to fit tightly within the opening of the work piece;

passing a mandrel through the fitting located in the work piece, the ring portion of the fitting having an inner perimeter sized to be radially expandable by an increased perimeter section of the mandrel, the first portion of the fitting having an inner perimeter sized to be slightly larger than the increased perimeter section of the mandrel;

expanding the ring portion of the fitting in an outwardly radial direction by physically contacting the increased perimeter section of the mandrel with the ring portion as the mandrel is forced through the inner circumference perimeter of the ring portion; and coupling a second device with the first portion of the fitting, the second device affixed to the conduit such that the conduit is routed through the secured fitting when the second device is attached.

25. The method of claim 24 wherein the mandrel comprises a circular tapered section that defines the increased perimeter section.

26. A method of installation, the method comprising:

inserting a first portion of a unitary fitting into an opening in a bulkhead;

moving the first portion through the opening so that at least a portion of a ring portion of the fitting is in the opening of the bulkhead and the first portion and a second portion of the fitting extend outwardly from opposite sides of the bulkhead, the ring portion being disposed between the first and second portions and having an outer circumference sized to fit tightly within the opening of the bulkhead;

inserting a mandrel through the fitting located in the bulkhead, the ring portion of the fitting having an inner circumference sized to be radially expanded by an increased circumference section of the mandrel, the first and second portions of the fitting each having an inner circumference sized to be slightly larger than the increased circumference section of the mandrel;

expanding the ring portion of the fitting in an outwardly radial direction as the mandrel is moved through the inner circumference of the ring portion, the outer circumference of the ring portion contacting the opening so as to form an interference fit between the fitting and the bulkhead; and after expanding the ring portion, coupling a first conduit to the first portion and a second conduit to the second portion, a passageway in the fitting extending between the first and second conduits.

27. The method of claim 26 wherein a hexagonal shaped flange for engaging a wrench extends in an outwardly radial direction from the ring portion.

* * * * *